(12) United States Patent
Ellis et al.

(10) Patent No.: US 7,391,719 B2
(45) Date of Patent: Jun. 24, 2008

(54) REDUNDANT NETWORK INTERFACE FOR ETHERNET DEVICES

(75) Inventors: David G. Ellis, Clifton Park, NY (US); Steven A. Schoenberg, Clifton Park, NY (US)

(73) Assignee: Sixnet, LLC, Clifton Park, NY (US)

( * ) Notice: Subject to any disclaimer, the term of this patent is extended or adjusted under 35 U.S.C. 154(b) by 1145 days.

(21) Appl. No.: 10/195,911

(22) Filed: Jul. 15, 2002

(65) Prior Publication Data

US 2004/0008722 A1    Jan. 15, 2004

(51) Int. Cl.
*G01R 31/08* (2006.01)
(52) U.S. Cl. .................................. 370/219; 370/395.32
(58) Field of Classification Search ........................ None
See application file for complete search history.

(56) References Cited

U.S. PATENT DOCUMENTS

| | | | | |
|---|---|---|---|---|
| 6,260,073 | B1 * | 7/2001 | Walker et al. ............... | 709/249 |
| 6,430,621 | B1 * | 8/2002 | Srikanth et al. ............. | 709/238 |
| 6,498,779 | B1 * | 12/2002 | Michaud et al. ............. | 370/227 |
| 2003/0043825 | A1 * | 3/2003 | Magnussen et al. ......... | 370/401 |
| 2003/0208618 | A1 * | 11/2003 | Mor et al. .................... | 709/238 |

* cited by examiner

*Primary Examiner*—Aung S. Moe
*Assistant Examiner*—Christopher P Grey
(74) *Attorney, Agent, or Firm*—Schmeiser, Olsen & Watts

(57) ABSTRACT

A redundant network interface for ethernet devices is disclosed. The redundant network interface provides connections between one or more Ethernet devices and two or more independent networks. The redundant network interface device also tests an active primary Ethernet connection path, and when a failure or inactive path is detected, the redundant network interface device reroutes the messages to alternate communication path.

32 Claims, 3 Drawing Sheets

REDUNDANT NETWORK INTERFACE FOR ETHERNET DEVICES

BACKGROUND OF THE INVENTION

1. Technical Field

The invention relates generally to a network switch for communications networks, and more particularly to a redundant network switch which is able to interface with and segregate two or more independent Ethernet networks. A method of using the redundant network switch interface device is also presented.

2. Related Art

It is often desirable to form multiple connections to devices on an Ethernet network to enhance reliability, or to connect one or more Ethernet device(s) to two independent networks. The vast majority of Ethernet devices have only a single Ethernet port, and/or either limited or no capabilities to make multiple, independent connections.

Local Ethernet devices are commonly connected to an Ethernet network by use of a device known as an Ethernet hub or network switch. These devices typically make the required connections with no regard to segregation or restriction of network traffic. There are significant limitations to the usefulness of using these network switches to make connection to independent networks. These limitations include, inter alia:

a) Unmanaged network switches pass messages from one network to the other, thus removing independence of the networks. This unwanted traffic increases network loading; can breach security through the undesirable transmission of messages; and can cause network conflicts if, for example, duplicate addressing is in use on the independent networks.

b) In the case of applications utilizing redundant network paths, unmanaged network switches could send messages back to network nodes that have received this message already from another path. This undesired event could cause unacceptable confusion on the network.

c) In redundant network schemes it is desirable to know when a failure in one of the network paths occurs so that a repair can be made. Network switches do not identify the path of the message for this purpose.

d) While many of these limitations can be overcome with a managed network switch or router, these complex devices require configuration and careful network planning. Further, the addition of new devices on the network or changes in the network topology can require reconfiguration for continued operation.

Accordingly, there exists a need for a simplified redundant network interface, which is capable of solving the above-mentioned limitations related to network switches for making connections to, as well as to providing segregation and redundancy for, independent networks.

SUMMARY OF THE INVENTION

It is therefore a feature of the present invention to overcome the above shortcomings related to segregation and redundancy for independent networks, by providing a method and apparatus for a redundant network interface embodied in a network switch which is able to interface with and segregate two or more independent Ethernet networks.

This invention disclosed herein is a network switch which is easily configured by a user possessing limited technical knowledge. The simplicity of this invention enhances reliability (through its simplicity), reduces installation time and skill level required, makes it practical to swap these devices when repairs are necessary, and makes it possible to view or control the flow of network traffic through commercially available industrial controllers or software.

The invention is built upon the observation that it is desirable for one or more Ethernet devices to communicate to each of two or more independent networks through "uplink" ports, and that as long as the uplink ports are not permitted to send messages between themselves, independence (i.e., segregation) of the networks is maintained. This embodiment uses an unmanaged network switch that is given a special rule to never pass messages from one uplink port to any other port designated as an uplink port. In this way, segregated traffic on the independent networks is maintained. An added benefit of this embodiment is that devices connected to the ports other than the uplink ports (i.e., local ports), may freely communicate amongst themselves, without restriction, and with the added benefit of improved network bandwidth by segregating local network traffic from wide area network traffic. All other benefits of the unmanaged network switch are maintained, such as avoidance of collisions, and limitation of broadcast message bandwidth.

In a first general aspect, the present invention provides a communications network comprising: at least two independent Ethernet networks, including a primary Ethernet network and an alternate Ethernet network, said independent Ethernet networks receiving information from one or more local network devices, and at least one network switch, wherein said network switch selectively enables communication between one of said primary network and said alternate network and said local network devices, and wherein said network switch selectively does not enable communication between said primary network and said alternate network.

In a second general aspect, the present invention provides a method of providing redundancy in a communications network, said method comprising: providing at least two independent networks, including a primary network and an alternate network, said independent networks each adapted to receive information from at least one local network device; providing at least one network switch, wherein said network switch selectively enables communication between one of said primary network and said alternate network and said local network device, and wherein said network switch does not enable communication between said primary network and said alternate network.

In a third general aspect, the present invention provides a network switch comprising: a first plurality of communication ports, said first plurality of communication ports coupled to at least two independent networks, including a primary network and an alternate network; a second plurality of communication ports, said second plurality of communication ports coupled to one or more local network devices; a plurality of communication path combinations available in said network switch, wherein each said communication path combination is selected from the group consisting of: the primary network to a first local network device; the primary network to a second local network device; the alternate network to the first local network device; the alternate network to the second local network device; and the primary network to the alternate network; and a system for preventing communication between said primary network and said alternate network through said network switch.

In a fourth general aspect, the present invention provides a method of network communication comprising: providing a first plurality of communication ports, said first plurality of communication ports coupled to at least two independent networks, including a primary network and an alternate network; providing a second plurality of communication ports, said second plurality of communication ports coupled to one or more local network devices; providing a plurality of communication path combinations available in a network switch, wherein each said communication path combination is selected from the group consisting of: a primary network to a first local network device; the primary network to a second local network device; an alternate network to the first local network device; the alternate network to the second local network device; and the primary network to the alternate network; and providing a system for preventing communication between said primary network and said alternate network through said network switch.

In a fifth general aspect, the present invention provides a local network device comprising: at least one first communication port, said first communication port adapted to communicate with a network switch; said local network device including at least one status signal; said status signal monitored by said network switch.

In a sixth general aspect, the present invention provides a method of communicating between a local network device and a network, said method comprising: providing at least one local network device and at least one network; providing at least one communication port of said local network device, said communication port adapted to communicate with said network via a network switch; providing said local network device with at least one status signal indicative of the operational status of the local network device; and providing said network switch with means for monitoring said status signal.

In a seventh general aspect, the present invention provides a computer program product, comprising: a computer usable medium having a computer readable program code stored therein for causing a communication path failure to be detected, the computer readable program code comprising: first computer readable program code for causing a computer to detect failures in at least one communication path; second computer readable program code for causing the computer to effect changes in the routing of said communication paths; and third computer readable program code for causing the computer to prevent establishment of specific communication paths.

The foregoing and other features and advantages of the invention will be apparent from the following more particular description of embodiments of the invention. It is to be understood that both the foregoing general description and the following detailed description are exemplary, but are not restrictive, of the invention.

BRIEF DESCRIPTION OF THE DRAWINGS

The features and inventive aspects of the present invention will become more apparent upon reading the following detailed description, claims and drawings, of which the following is a brief description.

DETAILED DESCRIPTION OF THE EMBODIMENTS

The following is a detailed explanation of the structure and method for a method and apparatus for a redundant network switch which is able to interface with and segregate two or more independent networks. For the purposes of illustration, these networks will be referred to as Ethernet networks herein. It should be noted that the same reference numbers are assigned to components having approximately the same functions and structural features in the following explanation and the attached drawings to preclude the necessity for repeated explanation thereof.

Figure 1:
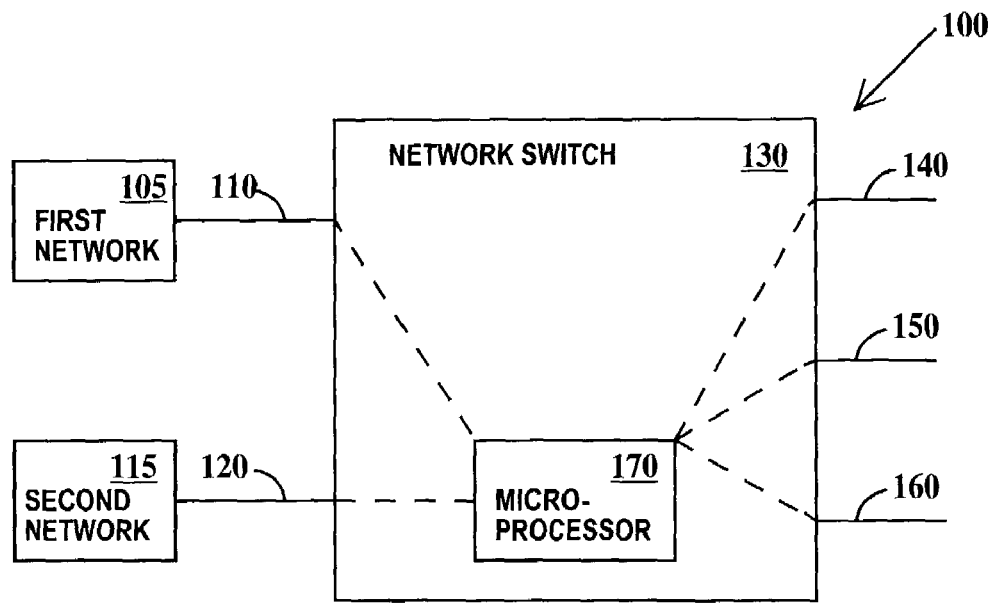
FIG. 1 is a schematic view of a communication network including a redundant network switch in accordance with an embodiment of the present invention.

According to a general illustrative embodiment of the present invention, shown schematically in FIG. 1, the illustrative system 100 described herein includes a network switch 130 which will function as an element in a larger network, for example, in an Ethernet network. An Ethernet network, as discussed herein including VLAN (to be discussed infra), is a local area network wherein data is broken into packets and transmitted within a network which network contains switch apparatus capable of rerouting the transmitted data. Each packet is transmitted, and arrives at its destination without colliding with any other packet. The first contention slot after a transmission is reserved for an acknowledge packet. A node is either transmitting or receiving at any instant. Moreover, the Ethernet networks discussed herein are characterized by certain unique Ethernet characteristics known to those skilled in the art, namely the use of an Ethernet frame structure; an unreliable and connectionless service to a network layer; baseband transmission with Manchester encoding; and use of a Carrier Sense Multiple Access with Collision Detection (CSMA/CD) multiple access algorithm. An Ethernet network will be discussed as relating to the illustrative embodiment for convenience sake, but this discussion is not meant to be limited to Ethernet networks only, nor to any particular type of network.

The Ethernet switches disclosed and claimed herein are as used in Ethernet systems by persons of ordinary skill in the art. The known Ethernet switches include, inter alia, two characteristics which are particularly relevant. First, MAC-based ports with I/O data frame buffers effectively isolate the port from data traffic being sent at the same time to or from other ports on the Ethernet switch. Second, multiple internal data paths allow data frames to be transferred between different ports at the same time. Because each port provides access to a high-speed network bridge (i.e., the switch), the collision domain in the network is reduced to a series of small domains in which the number of participants is reduced to two, namely the switch port and the connected Network Interface Card (NIC).

The first illustrative system 100 utilizes a feature which may be found in network switches, especially Ethernet switches. This feature is referred to as a Virtual Local Area Network (VLAN). A VLAN group represents a logical grouping of two or more nodes which are not necessarily on the same physical network segment, but which share the same network number or address. VLAN groups are often associated with switched Ethernet. Utilizing the VLAN group feature permits restriction of communications traffic to only selected communication ports, so that the communications traffic can be restricted, for example, to authorized groups of users or to specific devices.

Referring to FIG. 1, a network switch 130 is shown. Network switch 130 includes an embedded microprocessor 170, which is programmed for this application, and which is operatively connected to the first and second network (i.e., uplink)

ports 110, 120, respectively, of the network switch 130. Embedded microprocessor 170 is also operatively connected internally to the first, second and third device ports (i.e., local ports) 140, 150, 160, respectively, of the network switch 130. Local devices (not shown) connected to the device ports 140, 150, 160, include, inter alia, input and/or output devices, switches, transducers, etc.

Two or more restricted VLAN groups are configured by appropriate software programmed in the embedded microprocessor 170. The first VLAN group could include, for example, communication from first network port 110 to first, second and third device ports 140, 150, 160, respectively, via embedded microprocessor 170. Thus, the first VLAN group would connect the first network port 110 to any or all of the first, second, and third device ports 140, 150, 160.

Similarly, the second VLAN group would include, for example, communication from the second network port 120 to any or all of the first, second, and third device ports 140, 150, 160, via embedded microprocessor 170.

In addition, the embedded microprocessor 170 is included in both VLAN groups so that the microprocessor 170 can access all ports, both the network ports 110, 120 and the device ports 140, 150, 160 for diagnostic purposes. However, what is specifically prohibited, by the novel network switch disclosed herein, is inclusion of both network ports 110, 120 within the same VLAN group. Thus, communication through the network switch 130 between a first independent network 105 coupled to first network port 110 and a second independent network 115 coupled to second network port 120 is not allowed. The network switch 130, as used in this arrangement, further provides network redundancy should the first 105 or second 115 independent network fail. Networks 105, 115 may include, inter alia, network host devices, routers, servers, and the like.

The embedded microprocessor 170 is assigned an Internet Protocol (IP) address so that the embedded microprocessor can be addressed from means external to the network switch 130. Network configuration information, such as, inter alia, a configuration chart, is loaded into the embedded microprocessor 170 with the appropriate connection rules, including the primary and an optional secondary or alternate connection for each device port 140, 150, 160, as well as the IP or Media Access Control (MAC) addresses of network devices that are to be monitored. The use of both the IP and the MAC addresses allows both IP (e.g., TCP/IP (Transmission Control Protocol/Internet Protocol) and other Ethernet protocols, such as, inter alia, IEEE 802.2 LLC (Logic Link Control) to be implemented.

Periodically, a test message (such as, inter alia, a Packet InterNet Groper (PING)) is sent to each network device listed on the configuration chart to determine the operational status of the portion of the network connected between the network switch 130 and whatever devices are connected to the device ports 140, 150, 160 or the network ports 110, 120. If a station (e.g., a network device) fails to respond, then a failed or inactive network has been found, and a status bit is set accordingly in the embedded microprocessor 170. Optionally, one or more "retries" can be configured, and the timing of the tests can be configured by the user via a programmable device or other system for programming an embedded microprocessor as is known in the art. Upon detection of a failure to communicate over a particular port of the network switch 130, or to an inactive device, the embedded microprocessor 170 can command the network switch 130 to reconfigure the VLAN group so as to reroute traffic to a backup path which has been previously defined by the user. That is, software programmed in the embedded microprocessor 170 instructs the network switch to produce a new VLAN group configuration, which does not include the inactive networks or devices, but which does include active networks or devices. The new VLAN group configuration will exclude the network path which has been determined to be defective. The VLAN group configurations may be based on one of the following implementations, or a combination of them: a port-based VLAN; a MAC address-based VLAN; or a protocol-based VLAN. Further, the above VLAN group configurations may use either known implicit methods or explicit methods to indicate membership in a particular group when a signal travels between switches.

In this manner, this network switch 130 can be used to connect two (or more) independent networks to the same local device, by keeping two segregated VLAN groups in use, or by creating a backup system by switching the VLAN group configuration upon the failure of a network path. One advantage of this scheme is that the embedded microprocessor 170 has continuous access to all ports, even if they are not in active use. This enables a continuous test of all communication paths and verification of their readiness for use.

Figure 2:
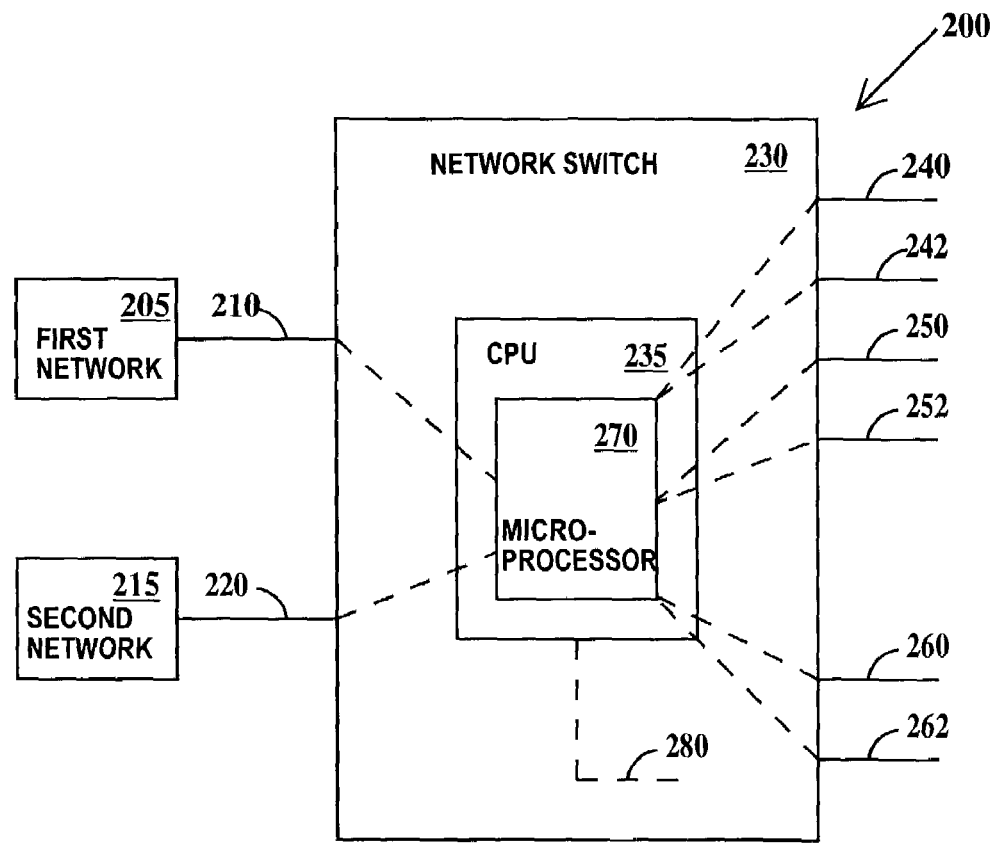
FIG. 2 is a schematic view of a redundant network switch in accordance with an embodiment of the present invention.

Referring to FIG. 2, a second illustrative system 200 depicts a more specific example including an Ethernet network switch 230 having two independent network ports 210, 220, respectively, and six device ports 240, 242, 250, 252, 260, 262, respectively. A ninth port 280 is used to connect to internal embedded microprocessor 270, which is added to this network switch 230 for the purposes of implementing this invention.

The number of uplink ports and device ports is not limited to these particular amounts. Rather, these amounts are intended to be used for illustrative purposes only. The second illustrative embodiment 200 is similar to a commercially available Ethernet store-and-forward network switch, such as, inter alia, a SIXNET switch, part number ET-GT-9ES-1, which has nine such Ethernet ports.

The embedded microprocessor 270 within this network switch 230 may be a dedicated microprocessor, or it may be part of the core circuitry found in an existing module, such as, for example, a SIXNET EtherTRAK I/O module (i.e., part number ET-16DI2-H). The core circuitry of this SIXNET module includes an embedded microprocessor (such as, inter alia, an Atmel Mega 103 microprocessor). Network switch 230 may also include peripheral circuitry (not shown) that includes a network port 210, (such as, inter alia, an Ethernet port) as well as other components (not shown) needed to make the embedded microprocessor 270 function properly. Program software and data are stored in memory related to the embedded microprocessor 270. Henceforth, this embedded microprocessor 270 and its related peripheral circuitry will be referred to as the Central Processing Unit (CPU) 235. Hence, the network 230 comprises the CPU 235, and the CPU 235 comprises the embedded microprocessor 270. Alternatively, the CPU 235 may also be incorporated in an Ethernet switch IC.

The network port on the CPU 235 is connected to the ninth (internal only) port 280 on the network switch 230 through the appropriate interface components (not shown). Programming or software is loaded into the CPU 235 such that, upon initialization of the network switch 230, software instructions will be loaded into the embedded microprocessor 270 or into the Ethernet switch IC to establish the VLAN group connections described below. The VLAN group connections will be implemented using either existing unused features of the Ethernet switch IC that implement the network path configurations, or by using the required features of other similar Ethernet switch ICs.

By default, two VLAN groups (i.e., the CPU 235 and clusters of ports that are permitted to communicate with each other) are established in the network switch 230. One VLAN group includes all of the local device ports 240, 242, 250, 252, 260, 262, the CPU 235, and the first network port 210, and is primarily intended to provide the first network port 210 with unrestricted communications with the local device ports 240, 242, 250, 252, 260, 262 and the CPU 235. The second VLAN group includes all local device ports 240, 242, 250, 252, 260, 262, the CPU 235, and the second network port 220, and is primarily intended to provide the second network port 220 with unrestricted communication with the local device ports 240, 242, 250, 252, 260, 262 and the CPU 235. The local device ports 240, 242, 250, 252, 260, 262 in the default configuration will be permitted to communicate with one another, and the CPU 235 will be permitted to talk to all ports. This functionality will be assumed in this document and the details of it are not important to describing the invention, but may in the most efficient embodiment, suggest the establishment of additional VLAN group connections. It is important to note that in none of the VLAN group connections is the first network port 210 permitted to exchange messages with the second network port 220.

In this basic configuration, no further intelligence is needed to permit each of the network ports 210, 220 free access to all of the local device ports 240, 242, 250, 252, 260, 262, as if it were the only network port in use. Since the two network ports 210, 220 cannot communicate with each other, they are invisible to each other, and the network switch 230 functions as if it were two independent network switches, each with a connection from its network 205, 215 to all of the local devices 240, 242, 250, 252, 260, 262 (or subsequent groups of local devices through additional downstream network switches) connected to local device ports 240, 242, 250, 252, 260, 262. In this configuration, redundancy is achieved by having two independent networks 205, 215 being able to access the local devices 240, 242, 250, 252, 260, 262 connected to this network switch 230.

By way of example, two computers (not shown) connected to the network ports 210, 220 on this network switch 230 could each poll all of the local device ports 240, 242, 250, 252, 260, 262. These two computers can have programming that causes said local device ports to monitor the quality of the various network connections, and also the quality of the data that travels over the network connections. These two computers can establish their own rules for handling the loss of data, or communications paths, by arbitrating the behavior of the programs running in these two computers, possibly using an independent communications link between the two computers to signal each other. This communications link would be exclusive of the VLAN groups' network paths to which each of the two computers is also connected.

The CPU 235 in this network switch 230 may be configured from an external computer (e.g., a configuration tool) through an Ethernet connection from any port on the network switch 230. Initialization of the CPU 235 itself, including the establishment of an IP address (i.e., the 32-bit host address defined by the Internet Protocol) for the CPU 235, is accomplished in a known manner usually employed to talk to an input/output (I/O) module, such as, inter alia, an EtherTRAK I/O module, which is a commercially available device, and which is well documented in its user manual. When the quality of specific network connections is determined, the resulting status flags will be stored in discrete I/O registers in the CPU 235.

Another aspect of the system 200 is the ability to set test polling characteristics, including the frequency of polling, the number of times to retry before reporting a failure, and the delay time to wait for a response to the test message (i.e., the ping), before assuming that communication has been lost, and therefore initiating a retry or report of a failure. In real-time industrial systems, the response time of the system can be important. The ability to control these parameters and thereby enable adequately responsive behavior without overly burdening the network with test messages or inadvertent failure reports is important to the overall performance of the system to which this invention is applied. Typically, in practical systems, polling can be set in the range of a few milliseconds to many seconds, response delays from 5 milliseconds to many seconds, and maximum retry attempts can vary from one to five. For example, if an Internet connection is present in the path of a test, the response to a ping can take seconds to be received.

So far what has been described is an embodiment in which two independent networks are managed passively, with the network management of any redundancy in communication paths occurring external to the network switch. The network management may or may not use the status information available in the I/O registers. The second method of configuration, however, utilizes the communication test results to switch between alternate network paths in the event of failure of one of the paths. This second method of configuration is discussed with respect to the illustrative embodiment of the system 300 in FIG. 3.

In system 300, the configuration of the virtual network connections is restricted to direct network messages from one or more device ports 340, 350, 360 to a single network port 310, which is designated the primary network path for that particular communication scheme. The second path, not presently in use, will be referred to as the secondary or alternate network path. This second path would be between the one or more device ports 340, 350, 360 and single network port 320. In order to permit constant testing of both the primary and the secondary path, virtual connections between the CPU 335 and the primary and secondary paths are established. A virtual connection is a connection or path through a network. The word "virtual" is used to indicate that the connection is logical rather than physical. The virtual connection is established when the Ethernet switch IC is instructed to forward packets to a particular port. The virtual connection used herein make the paths independent of the configuration presently in use, which may be blocking network traffic to either of the network ports 310, 320 depending on the results of ongoing communication tests.

In this case, the two communication paths may or may not be connected to the same Ethernet device. This is not of primary importance, as long as both paths are capable of passing the message to the intended receiving station. The two paths are not in use at the same time (to avoid confusion on the network) except by the CPU 335, which may use unique addresses for each path. When a switch over occurs, the receiving device (not shown) connected to a device port 340, 350, 360 is capable of accepting the message from the alternate path and routing it to its intended destination.

The CPU 335 may use distinct MAC and TCP/IP addresses for each network port 305, 315. Distinct MAC addresses are required to prevent other Ethernet switches from erroneously updating their connection tables. With a single MAC address for the CPU 335, if both the primary and secondary paths traverse the same Ethernet switch, it would always direct messages to the CPU 335 out of the port of the most recently used path, but the CPU 335 needs to use both paths. Distinct TCP/IP addresses may be needed since the IP address generally determines which interface or port to use when sending a message.

When a failure of a primary communication path is detected, the CPU 335 directs the configuration switch 370 to reconfigure the virtual connection groups in a manner prescribed in the configuration data loaded into the CPU 335. As a practical embodiment, options will be presented as part of the configuration rules to either:

1) have the device port(s) 340, 350, 360 remain connected to the secondary path once a failure of the primary path is detected;
2) switch the device port(s) 340, 350, 360 back and forth between the two paths each time a failure of the path in use is detected; or
3) switch the device port(s) 340, 350, 360 back to the primary path if a subsequent test demonstrates that the primary path has been restored or otherwise has once again become capable of proper operation.

Figure 3:
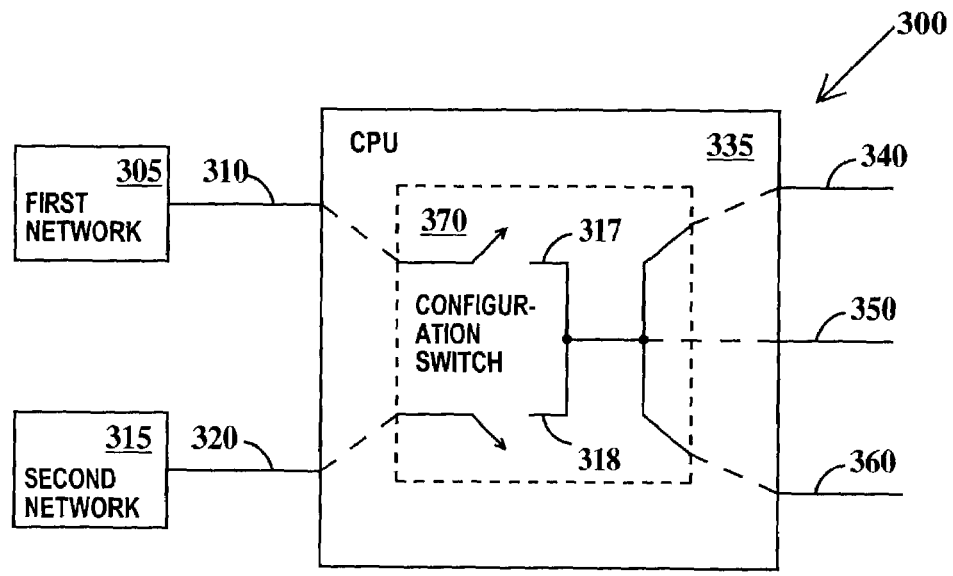
FIG. 3 is a schematic view of a redundant network switch in accordance with an embodiment of the present invention.

These three scenarios can be illustrated with reference to FIG. 3, wherein it is assumed that network port 310 is the primary port and network port 320 is the secondary port. Also, CPU 335 directs configuration switch 370 which includes a first switch 317 and a second switch 318. As an initial condition, the primary path would be operating, so that operational connections exist between the first or primary network port 310 and the device port(s) 340, 350, 360. In the first scenario, a failure in the primary path connected to primary network port 310 is detected. Therefore, second switch 318 closes, while first switch 317 opens. The result is that the device ports 340, 350, 360 are now connected to the operative network port 320.

In the second scenario, the situation just described would occur when the primary path fails. Then, assuming the primary path is restored and the secondary path fails, device ports 340, 350, 360 are connected to the primary network port 310 by the closing of first switch 317 and the opening of second switch 318. Thus, communication between the device ports 340, 350, 360 and the primary network is restored. Then, if the primary network again fails, the switching of scenario 1 above is repeated. Finally, these switching scenarios may be repeatedly performed as one network is restored and the other fails.

The third scenario assumes that, while the primary path has failed and the network is operating on the secondary path, and the primary path has been subsequently restored. Configuration switch 370 may be, inter alia, an electronic routing means, a switching means, a steering means, etc., which temporarily stores and holds data packets. For clarity in this discussion, the configuration switch 370 is depicted as a mechanical switch. However, this embodiment is for clarification, and is not meant to be limiting. In this case, the configuration switch 370 may revert to the primary path by effectively closing switch 317 and effectively opening switch 318, in response to preprogrammed instructions to always use the primary path when is available. In this scenario, the secondary path is maintained as the spare path for use whenever the primary path is not available, and only when the primary path is not available.

Some Ethernet devices, including the store-and-forward switch incorporated into the ET-GT-9ES-1 and used in the second illustrative embodiment this invention, remember the network path used to communicate with particular Ethernet devices as a means to efficiently route messages over only the required network segment. Store-and-forward messaging, or message switching, is a known type of message passing system wherein a complete message is received before it is passed on to the next node. These store-and-forward devices remember the location of an Ethernet device by detecting the source of a message arriving on a port (i.e., the detection of the source MAC address in a transmitted Ethernet message packet). In situations in which other local devices are sending messages to a particular local device that will not send a message until requested to do so, the network switch will not detect the change in path for perhaps several minutes, when the seemingly unused path ages off of the active list of connections.

Figure 4:
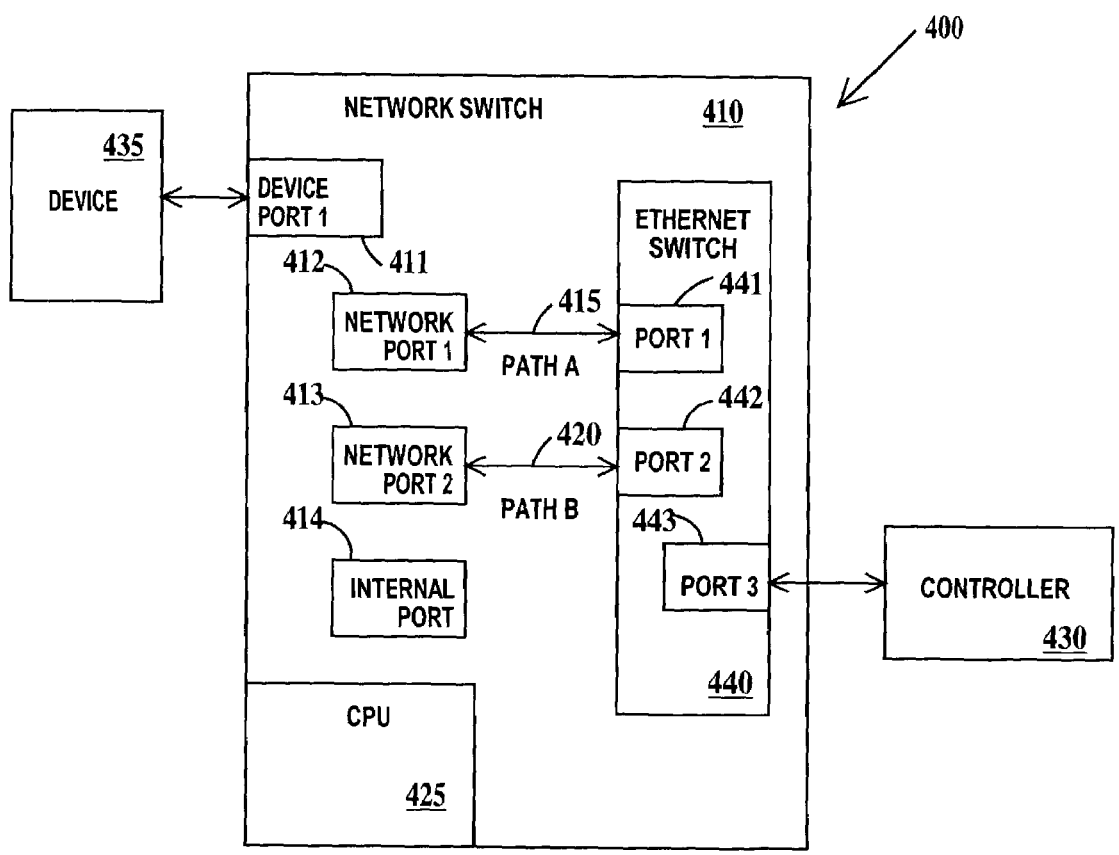
FIG. 4 shows a schematic representation of a network system including a network switch used manage two redundant paths in accordance with an embodiment of the present invention.

Additional means may be employed to rapidly update the routing information for other Ethernet network switches connected to the redundant network switch of the present invention. For example, FIG. 4 shows a schematic representation of a network system 400 wherein a network switch 410 is used manage two redundant paths 415, 420 so that controller 430 can always talk to device 435 provided at least one of the paths 415, 420 is operational. Network switch 410 also includes Ethernet switch 440. Peripheral circuitry (not shown), associated with an embedded microprocessor includes an Ethernet port and other components needed to make the microprocessor function. Program and data memory for the microprocessor may be included within the integrated circuit itself. For the purposes of this discussion, the microprocessor and its related peripheral circuitry will be referred to as CPU 425. CPU 425 may also be part of Ethernet switch 440, or they may be separate devices.

An Ethernet port on the CPU 425 is connected to the an internal-only port 414 of the Ethernet switch 440 via appropriate interface components. Programming is loaded into the CPU 425 that, upon initialization of the network switch 410, will load instructions into the Ethernet IC or switch 440 to establish the VLAN group connections described infra. The VLAN group connections may be implemented either using existing unused features of the Ethernet switch IC that implement network path configuration, or using the required features of other similar Ethernet switch ICs.

Device port 411 is connected to network port 412 and port 441 is considered by the Ethernet switch 440 to be in use. If first path 415 is in use, then fails, and the network switch 410 determines that second path 420 must now be used, merely reconfiguring the virtual group connections in the network switch 410 to connect device port 411 from the network port 412 to network port 413 will not immediately restore communications. The Ethernet switch 440 still considers the controller 430 (e.g., an input/output device) as connected using the first path 415, which the device 435 is not allowed to use. Ethernet switch 440 still considers first path 415 as the connection to the device 435, but any messages sent via that (failed) first path 415 will be rejected by the Ethernet switch 440 in the network switch 410. To avoid this situation, the network switch 410 can be configured to send special messages from the CPU 425 to one or more specific network devices (e.g., device 435) after a switch over in network ports 412, 413 occurs. The messages and the resulting responses will inform the Ethernet switch 440 that port 442, instead of port 441 must be used. Each message and response can update the Ethernet switch 440 for one MAC address (i.e., the hardware address of a device connected to the shared network) that is connected to the network switch 410 via a device port 411 and one controller 430 connected via a network port 412, 413. In the example, the CPU 425 must send one message via internal port 414 to update the network switch's internal connection tables as follows:

1. A message is sent by the CPU 425 to the controller 430 using the MAC and IP addresses of the device 435 as the source, and the broadcast MAC address (i.e., so that the transmission is sent to multiple, unspecified recipient devices, and these devices are always willing to receive the transmission) and the IP address of the controller 430 as the destination. A signal from the controller 430 indicating successful receipt of the message informs Ethernet Switch 440 that the device 435 is now using the second path 420. The broadcast address is used to ensure the message is sent out to all ports, including the second network port 413.

2. The reply (or any subsequent message) from the controller 430 instructs the Ethernet switch 440 in the network switch 410 that the controller 430 is using the second path 420.

The messages for each device 435 or controller 430 after the first message would be similarly transmitted, but if there are more devices than controllers, the broadcast MAC address can be changed to the specific address of one of the controllers, or even an unused address, to reduce network traffic. Note that the MAC addresses used in the above example are the MAC addresses associated with the IP address of the recipient device as seen by the network switch 410, and which may, alternatively, be the MAC address of an IP gateway that is used to communicate with the IP address. As used herein, the term "gateway" refers to any one of the following, inter alia: a "protocol converter" to connect networks using different protocols; a "router" to connect two broadcast networks at a network layer; or a mail gateway (i.e., an application layer gateway).

One final note, during the time between the failure of a communication path and the redirection of network messages to an alternative path, message packets will likely be lost. It is assumed in this embodiment, that so-called "robust" communications systems (i.e., the communications systems have an ability to recover from a whole range of exceptional inputs and other abnormal situations in a given environment) exist between all critical network paths, and that the robust communications systems will, on their own initiative, send retries as needed. It is also assumed for a successful embodiment that the test-and-switch-over parameters (i.e., those parameters programmed into the network switch which control when a network switch operation is necessary to change paths, and how the switch of the paths is accomplished) configured into this inventive network switch are sufficiently responsive as to be compatible with the dynamics of the messaging requirements of the overall network system. These details are the responsibility of the individual that specifies the network system and configures the application specific parameters into the CPU 425 of this invention. Operation of CPU 425 is similar to that of CPU 235 discussed supra.

Figure 5:
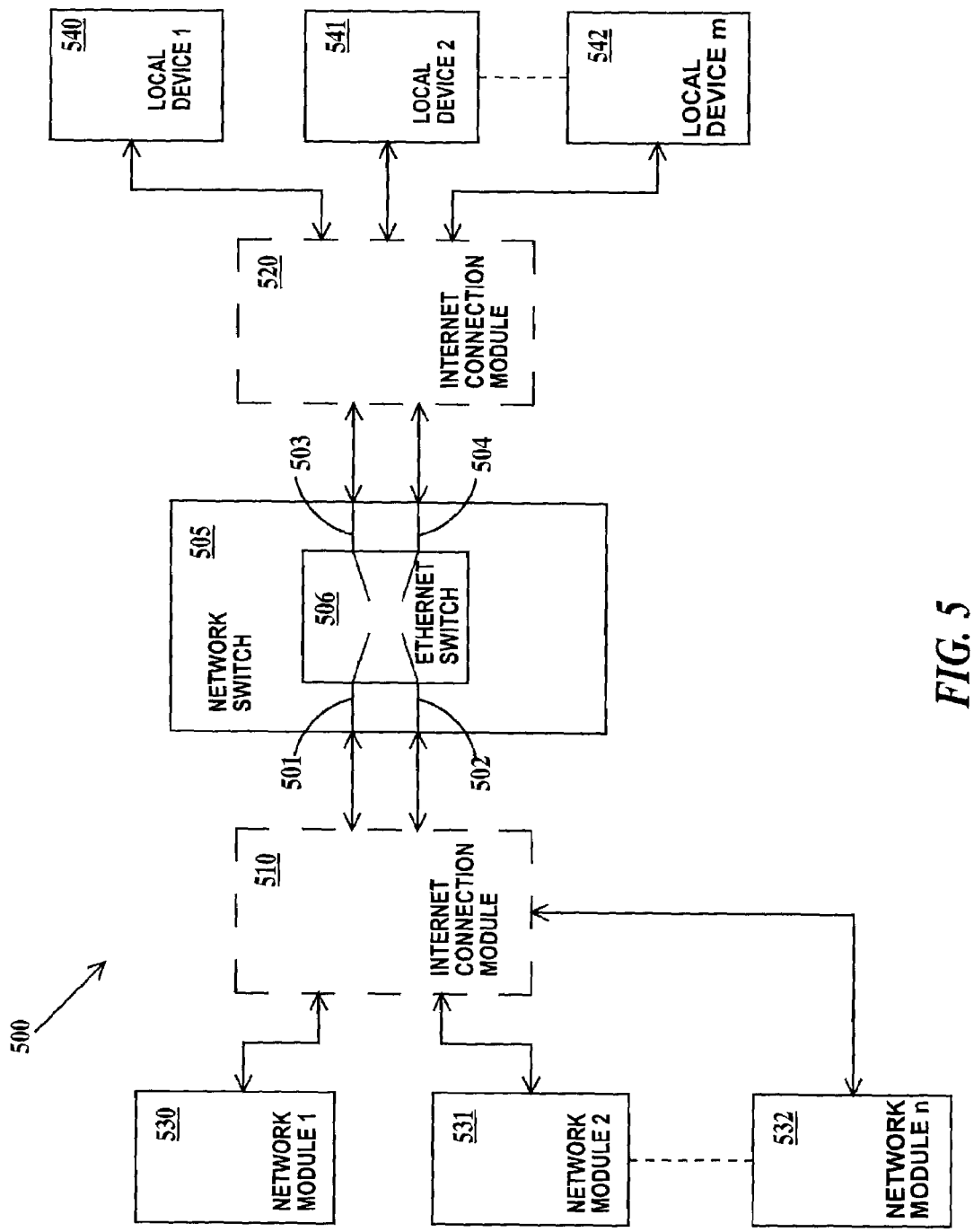
FIG. 5 shows a schematic representation of a network system including Internet connections in accordance with an embodiment of the present invention.

FIG. 5 shows a schematic representation of a network system 500 including Internet connection modules 510, 520 in accordance with an embodiment of the present invention. Either or both of Internet connection modules 510, 520 may be present. In this embodiment, network switch 505 includes ethernet switch 506, network ports 501, 502 and device ports 503, 504. Network switch 505 functions as network switch 410 described supra, except in this embodiment, the network switch 505 is part of an overall network system 500 which includes one or more Internet connection modules 510, 520. A series of n network connection modules 530, 531, 532 are connected to network ports 501, 502 of network switch 505 via at least one Internet connection module 510. Network modules 530, 531, 532 provide access to existing networks. Similarly, a series of m local devices 540, 541, 542 are connected to device ports 503, 504 of network switch 505 via at least one Internet connection module 520. The number (i.e., n and m) of the various elements shown is intended for illustrative purposes only, and is not intended to be taken as limiting.

Embodiments of the present invention have been disclosed. A person of ordinary skill in the art would realize, however, that certain modifications would come within the teachings of this invention. For example, rather than the single device embodiment discussed herein regarding FIG. 4, the present invention also encompasses embodiments wherein there are a plurality of devices and/or a plurality of network switches. Other alternative embodiments could include a plurality of network switches connected in series or in parallel with each other, the combined conglomeration of network switches then connected to a plurality of network segments, etc. Therefore, the following claims should be studied to determine the true scope and content of the invention.

What is claimed is:

1. A communications network comprising:
a primary Ethernet network;
an alternate Ethernet network, wherein said primary Ethernet network is independent from said alternate Ethernet network, and wherein said primary Ethernet network is not connected to said alternate Ethernet network; and
a network switch comprising a central processing unit internal to said network switch, wherein said central processing unit is directly connected to said primary Ethernet network and said alternate Ethernet network, wherein said central processing unit is configured to prevent communications between said primary Ethernet network and said alternate Ethernet network, wherein said central processing unit comprises an embedded microprocessor, wherein said primary Ethernet Network is configured to be connected to at least one local network device through said embedded microprocessor, wherein said alternate Ethernet network is configured to be connected to said at least one local network device through said embedded microprocessor, wherein said at least one local network device is not located within said primary Ethernet network or said alternate Ethernet network, wherein said embedded microprocessor comprises a configuration chart internal to said embedded microprocessor, wherein configuration chart comprises connection rules associated with said primary Ethernet network and said alternate Ethernet network, wherein said configuration chart comprises a primary connection and an optional secondary connection for said at least one local network device, wherein said configuration chart comprises an Internet protocol (IP) address or media access control (MAC) address of said at least one local network device, wherein said primary Ethernet network is configured to receive information from said at least one local network device and said network switch, wherein said alternate Ethernet network is configured to receive said information from said at least one local network device and said network switch, wherein said information is routed through said embedded microprocessor, wherein said network switch selectively enables communication between said primary Ethernet network and said at least one local network device or between said alternate Ethernet network and said at least one local network device, wherein said primary Ethernet network in combination with said central processing unit and said at least one local network device forms a first virtual local area network (VLAN), wherein said alternate Ethernet network in combination with said central processing unit and said at least one local network device forms a second VLAN, wherein said network switch does not enable communication between said primary Ethernet network and said alternate Ethernet network, wherein said microprocessor is configured to send a test message to said at least one local network device in order to determine an operational status of said primary Ethernet network, wherein said communications network is configured to set a status bit in said microprocessor if said operational status indicates that said primary Ethernet network comprises a communication failure, wherein said central processing unit comprises configuration data within said configuration chart and a configuration switch internal to said central processing unit, and wherein the central processing unit in response to the configuration data and said status bit is configured to direct the internal configuration switch to switch from said first VLAN to said second VLAN, wherein said embedded microprocessor is configured to accept programming of polling characteristics for polling said at least one local network device, and wherein said polling characteristics consist of a frequency of polling of said at least one local network device, a number of times for sending said test message before reporting a failure, and a delay time for waiting for a response to said test message.

2. The communications network of claim 1, wherein said network switch includes:
a network port;
a device port; and
an Ethernet switch connected to said network port and said device port, wherein said Ethernet switch couples said network port to said device port.

3. The communications network of claim 2, wherein said configuration switch is further configured to control coupling of said network port to said device port within said Ethernet switch.

4. The communications network of claim 1, wherein said embedded microprocessor is configured to send said test message to said at least one local network device multiple times at various time intervals.

5. A method of providing redundancy in a communications network, said method comprising:
providing a primary Ethernet network, an alternate Ethernet network, and a network switch comprising a central processing unit internal to said network switch, wherein said central processing unit is directly connected to said primary Ethernet network and said alternate Ethernet network, wherein said central processing unit is configured to prevent communications between said primary Ethernet network and said alternate Ethernet network, wherein said central processing unit comprises an embedded microprocessor, wherein said primary Ethernet network is configured to be connected to at least one local network device through said embedded microprocessor, wherein said alternate Ethernet network is configured to be connected to said at least one local network device through said embedded microprocessor, wherein said at least one local network device is not located within said primary Ethernet network or said alternate Ethernet network, wherein said embedded microprocessor comprises a configuration chart internal to said embedded microprocessor, wherein configuration chart comprises connection rules associated with said primary Ethernet network and said alternate Ethernet network, wherein said configuration chart comprises a primary connection and an optional secondary connection for said at least one local network device, wherein said configuration chart comprises an Internet protocol (IP) address or media access control (MAC) address of said at least one local network device, wherein said central processing unit comprises configuration data within said configuration chart and a configuration switch internal to said central processing unit, wherein said primary Ethernet network is independent from said alternate Ethernet network, wherein said primary Ethernet network is not connected said alternate Ethernet network, wherein said primary Ethernet network is configured to receive information from said at least one local network device, wherein said alternate Ethernet network is configured to receive said information from said local network device, wherein said information is routed through said embedded microprocessor, and wherein said primary Ethernet network in combination with said central processing unit and said at least one local network device forms a first virtual local area network (VLAN), wherein said alternate Ethernet network in combination with said central processing unit and said at least one local network device forms a second VLAN;
accepting, by said embedded microprocessor, programming of polling characteristics for polling said at least one local network device, wherein said polling characteristics consist of a frequency of polling of said at least one local network device, a number of times for sending said test message before reporting a failure, and a delay time for waiting for a response to said test message;
selectively enabling by said network switch, communication between said primary network and said at least one local network device or between said alternate Ethernet network and said at least one local network device, wherein said network switch does not enable communication between said primary network and said alternate network;
sending, by said microprocessor, a test message to said at least one local network device in order to determine an operational status of said primary Ethernet network;
indicating, by said operational status, that said primary Ethernet network comprises a communication failure;
setting, by said communications network, a status bit in said microprocessor to indicate that said primary Ethernet network comprises a communication failure; and
directing, by the central processing unit in response to the configuration data and said status bit, the internal configuration switch to switch from said first VLAN to said second VLAN.

6. The method of claim 5, wherein said network switch comprises a network port, a device port, and an Ethernet switch, and wherein said method further comprises:
connecting said at least one Ethernet switch to said network port and said device port, wherein said Ethernet switch couples said network port to said device port.

7. The method of claim 6, wherein said configuration switch is configured to control coupling of said network port to said device port within said Ethernet switch.

8. The method of claim 5, further comprising:
sending, by said embedded microprocessor, said test message to said at least one local network device multiple times at various time intervals.

9. A network switch comprising:
a first plurality of communication ports, said first plurality of communication ports coupled to a primary Ethernet network and an alternate Ethernet network, wherein said primary Ethernet network is independent from said alternate Ethernet network, wherein said primary Ethernet network is not connected to said alternate Ethernet network;

a second plurality of communication ports, said second plurality of communication ports coupled to one or more local network devices;

a plurality of communication path combinations available in said network switch, wherein each said communication path combination is selected from the group consisting of: the primary Ethernet network to a first local network device; the primary Ethernet network to a second local network device; the alternate Ethernet network to the first local network device; and the alternate Ethernet network to the second local network device; and a central processing unit internal to said network switch, wherein said central processing unit comprises an embedded microprocessor, wherein said central processing unit is directly connected to said primary Ethernet network and said alternate Ethernet network, wherein said central processing unit is configured to prevent communications between said primary Ethernet network and said alternate Ethernet network, wherein said primary Ethernet network is configured to be connected to said first network device or said second network device through said embedded microprocessor, wherein said alternate Ethernet network is configured to be connected to said first network device or said second network device through said embedded microprocessor, wherein said first network device and said second network device are not located within said primary Ethernet network or said alternate Ethernet network, wherein said embedded microprocessor comprises a configuration chart internal to said embedded microprocessor, wherein configuration chart comprises connection rules associated with said primary Ethernet network and said alternate Ethernet network, wherein said configuration chart comprises a primary connection and an optional secondary connection for said at least one local network device, wherein said configuration chart comprises an Internet protocol (IP) address or media access control (MAC) address of said at least one local network device, wherein said primary Ethernet network is configured to receive information from said first local network device or said second local network device and said network switch, wherein said alternate Ethernet network is configured to receive said information from said first local network device or said second local network device and said network switch, wherein said information is routed through said embedded microprocessor, wherein said central processing unit comprises configuration data within said configuration chart and a configuration switch internal to said central processing unit, wherein said primary Ethernet network in combination with said central processing unit and said first local network device forms a first virtual local area network (VLAN), wherein said alternate Ethernet network in combination with said central processing unit and said first local network device forms a second VLAN, wherein said embedded microprocessor is configured to send a test message to said first local network device in order to determine an operational status of said primary Ethernet network, wherein said communications network is configured to set a status bit in said microprocessor if said operational status indicates that said primary Ethernet network comprises a communication failure, wherein said central processing unit comprises configuration data and a configuration switch internal to said central processing unit, and wherein the central processing unit in response to the configuration data and said status bit is configured to direct the internal configuration switch to switch virtual connections from the central processing unit to the primary Ethernet network or the alternate Ethernet network from said first VLAN to said second VLAN, and wherein said embedded microprocessor is configured to accept programming of polling characteristics for polling said at least one local network device, and wherein said polling characteristics consist of a frequency of polling of said at least one local network device, a number of times for sending said test message before reporting a failure, and a delay time for waiting for a response to said test message.

10. The network switch of claim 9, wherein said network switch further comprises:
a system for monitoring a status of said primary Ethernet network and said alternate Ethernet network;
apparatus for detecting a failed network, said failed network being said primary Ethernet network that has failed or said alternate Ethernet network that has failed;
a system for making the failed network an inactive network;
a system for making the remaining network an active network, said remaining network being one of said primary Ethernet network that has not failed or said alternate Ethernet network that has not failed; and
a system for rerouting communication, such that the communication, that was passed through the network that has failed, is passed through the network that has not failed.

11. The network switch of claim 9, wherein said network switch further comprises:
a programmable device, wherein said programmable device includes a memory storage system;
a routing system for enabling at least one of said communication path combinations, wherein said programmable device controls said routing system; and
a system for programming said programmable device to disable at least one of said plurality of communication path combinations.

12. The network switch of claim 11, wherein:
said programmable device includes operating software, said operating software responsive to communication from said primary Ethernet network or said alternate Ethernet network, from a remote device, or from a manual input device.

13. The network switch of claim 11, wherein said programmable device is said embedded microprocessor within said central processing unit.

14. The network switch of claim 13, wherein:
said microprocessor is connected to a port of the network switch;
said primary Ethernet network and said alternate Ethernet network are connected to said local network devices, wherein at least one of said primary Ethernet network and said alternate Ethernet network is enabled; and
said embedded microprocessor is connected to at least two restricted VLAN groups.

15. The network switch of claim 13, wherein an IP address is assigned to the embedded microprocessor.

16. The network switch of claim 9, wherein said network switch is an Ethernet device.

17. The network switch of claim 16, wherein said network switch is a VLAN switch.

18. The network switch of claim 9, further comprising a network port connected to an internet connection module, said internet connection module connecting said network switch to said primary Ethernet network and said alternate Ethernet network.

19. The network switch of claim 9, further comprising device port connected to an internet connection module, said internet connection module connecting said network switch to said primary Ethernet network and said alternate Ethernet network.

20. A method of network communication comprising:
providing a first plurality of communication ports, said first plurality of communication ports coupled to a primary Ethernet network and an alternate Ethernet network, wherein said primary Ethernet network is independent from said alternate Ethernet network, and wherein said primary Ethernet network is not connected to said alternate Ethernet network;
providing a second plurality of communication ports, said second plurality of communication ports coupled to one or more local network devices;
providing a plurality of communication path combinations available in a network switch, wherein each said communication path combination is selected from the group consisting of: the primary Ethernet network to a first local network device; the primary Ethernet network to a second local network device; the alternate Ethernet network to the first local network device; the alternate Ethernet network to the second local network device; and
providing within said network switch, a central processing unit internal to said network switch, wherein said central processing unit comprises an embedded microprocessor, wherein said central processing unit is directly connected to said primary Ethernet network and said alternate Ethernet network, wherein said central processing unit is configured to prevent communications between said primary Ethernet network and said alternate Ethernet network, wherein said primary Ethernet network is configured to be connected to said first network device or said second network device through said embedded microprocessor, wherein said alternate Ethernet network is configured to be connected to said first network device or said second network device through said embedded microprocessor, wherein said first network device and said second network device are not located within said primary Ethernet network or said alternate Ethernet network, wherein said embedded microprocessor comprises a configuration chart internal to said embedded microprocessor, wherein configuration chart comprises connection rules associated with said primary Ethernet network and said alternate Ethernet network, wherein said configuration chart comprises a primary connection and an optional secondary connection for said at least one local network device, wherein said configuration chart comprises an Internet protocol (IP) address or media access control (MAC) address of said at least one local network device, wherein said primary Ethernet network is configured to receive information from said first local network device or said second local network device and said network switch, wherein said alternate Ethernet network is configured to receive said information from said first local network device or said second local network device and said network switch, wherein said information is routed through said embedded microprocessor, wherein said central processing unit comprises configuration data within said configuration chart and a configuration switch internal to said central processing unit, wherein said primary Ethernet network in combination with said central processing unit and said first local network device forms a first virtual local area network (VLAN), wherein said alternate Ethernet network in combination with said central processing unit and said first local network device forms a second VLAN, wherein said microprocessor is configured to send a test message to said first local network device in order to determine an operational status of said primary Ethernet network, wherein said communications network is configured to set a status bit in said embedded microprocessor if said operational status indicates that said primary Ethernet network comprises a communication failure, wherein said central processing unit comprises configuration data and a configuration switch internal to said central processing unit, and wherein the central processing unit in response to the configuration data and said status bit is configured to direct the internal configuration switch to switch virtual connections from the central processing unit to the primary Ethernet network or the alternate Ethernet network from said first VLAN to said second VLAN, and wherein said embedded microprocessor is configured to accept programming of polling characteristics for polling said at least one local network device, and wherein said polling characteristics consist of a frequency of polling of said at least one local network device, a number of times for sending said test message before reporting a failure, and a delay time for waiting for a response to said test message.

21. The method of claim 20, wherein said network switch further comprises:
a system for monitoring a status of said primary Ethernet network and said alternate Ethernet network;
a system for detecting a failed network, said failed network being said primary Ethernet network that has failed or said alternate Ethernet network that has failed;
a system for making the failed network an inactive network;
a system for making the remaining network an active network, said remaining network being one of said primary Ethernet network that has not failed or said alternate Ethernet network that has not failed; and
a system for rerouting communication to the network that has not failed.

22. The method of claim 20, wherein said network switch further comprises:
a programmable device, wherein said programmable device includes a memory storage system;
a routing system for enabling at least one of said communication path combinations, wherein said programmable device controls said routing system; and
a system for programming said programmable device to disable at least one of said plurality of communication path combinations.

23. The method of claim 22, wherein:
said programmable device includes operating software, said operating software responsive to communication from said primary Ethernet network or said alternate Ethernet network, from a remote device, or from a manual input device.

24. The method of claim 22, wherein said network switch is a VLAN switch.

25. The method of claim 22, wherein said programmable device is said embedded microprocessor within said central processing unit.

26. The method of claim 25, wherein:
said embedded microprocessor is connected to a port of the network switch;
said primary Ethernet network and said alternate Ethernet network are connected to said local network devices, wherein at least one of said primary Ethernet network and said alternate Ethernet network is enabled; and said embedded microprocessor connected to at least two restricted VLAN groups.

27. The method of claim 25, wherein an IP address is assigned to the embedded microprocessor.

28. The method of claim 20, wherein said network switch is an Ethernet device.

29. The method of claim 20, further comprising providing an internet connection, said internet connection connecting said network switch to said primary Ethernet network and said alternate Ethernet network.

30. The present invention provides a computer program product, comprising a computer readable medium comprising a computer readable program code embodied therein, said computer readable program code adapted to implement a method for providing redundancy in a communications network, said method comprising:

providing a primary Ethernet network, an alternate Ethernet network, and a network switch comprising a central processing unit internal to said network switch, wherein said central processing unit is directly connected to said primary Ethernet network and said alternate Ethernet network, wherein said central processing unit is configured to prevent communications between said primary Ethernet network and said alternate Ethernet network, wherein said central processing unit comprises an embedded microprocessor, wherein said primary Ethernet network is configured to be connected to at least one local network device through said embedded microprocessor, wherein said alternate Ethernet network is configured to be connected to said at least one local network device through said embedded microprocessor, wherein said at least one local network device is not located within said primary Ethernet network or said alternate Ethernet network, wherein said embedded microprocessor comprises a configuration chart internal to said embedded microprocessor, wherein configuration chart comprises connection rules associated with said primary Ethernet network and said alternate Ethernet network, wherein said configuration chart comprises an Internet protocol (IP) address or media access control (MAC) address of said at least one local network device, wherein said central processing unit comprises configuration data within said configuration chart and a configuration switch internal to said central processing unit, wherein said primary Ethernet network is independent from said alternate Ethernet network, wherein said primary Ethernet network is not connected said alternate Ethernet network, wherein said primary Ethernet network is configured to receive information from said at least one local network device, wherein said alternate Ethernet network is configured to receive said information from said local network device, wherein said information is routed through said embedded microprocessor, and wherein said primary Ethernet network in combination with said central processing unit and said at least one local network device forms a first virtual local area network (VLAN), wherein said alternate Ethernet network in combination with said central processing unit and said at least one local network device forms a second VLAN;

accepting, by said embedded microprocessor, programming of polling characteristics for polling said at least one local network device, wherein said polling characteristics consist of a frequency of polling of said at least one local network device, a number of times for sending said test message before reporting a failure, and a delay time for waiting for a response to said test message;

selectively enabling by said network switch, communication between said primary network and said at least one local network device or between said alternate Ethernet network and said at least one local network device, wherein said network switch does not enable communication between said primary network and said alternate network;

sending, by said microprocessor, a test message to said at least one local network device in order to determine an operational status of said primary Ethernet network;

indicating, by said operational status, that said primary Ethernet network comprises a communication failure;

setting, by said communications network, a status bit in said microprocessor to indicate that said primary Ethernet network comprises a communication failure; and directing, by the central processing unit in response to the configuration data and said status bit, the internal configuration switch to switch from said first VLAN to said second VLAN.

31. The computer program product of claim 30, wherein said network switch comprises a network port, a device port, and an Ethernet switch, and wherein said method further comprises:

connecting said at least one Ethernet switch to said network port and said device port, wherein said Ethernet switch couples said network port to said device port.

32. The computer program product of claim 30, wherein said configuration switch is adapted to control coupling of said network port to said device port within said Ethernet switch.

* * * * *